Patented Mar. 31, 1925

1,531,583

UNITED STATES PATENT OFFICE.

EDMUND H. TWIGHT, OF FRESNO, CALIFORNIA.

FOOD PRODUCT AND METHOD OF MAKING THE SAME.

No Drawing.   Application filed August 15, 1922.  Serial No. 582,088.

*To all whom it may concern:*

Be it known that I, EDMUND H. TWIGHT, a citizen of the United States of America, and a resident of Fresno, county of Fresno, and State of California, have invented a new and useful Food Product and Method of Making the Same, of which the following is a specification.

My invention relates to a food product and the method of making it.

One of the objects of the invention is the provision of a new food product made from the juice of fruits.

My invention possesses other objects and features of advantage, some of which, with the foregoing, will be set forth in the following description of my invention. It is to be understood that I do not limit myself to the showing made by the said description as I may adopt variant forms of my invention within the scope of the claims.

In terms of broad inclusion, my invention comprises the concentration or thickening of a fruit juice, such as grape juice, and the working of the hot concentrate, while cooling, to incorporate minute bubbles of gas and effect a crystallization so that a honey-like product is formed. The product of my invention is not jelly, nor is it sirup. It is honey-like in consistency, and but for the waxy content of honey would resemble it in flavor also. My product is in fact an artificial honey minus the wax flavor found in natural bees' honey. If demanded by the trade, such wax flavor may be imparted to my product to more clearly simulate the natural honey.

The first steps in my process are substantially those now commonly used in making fruit sirups. That is to say, the juice is extracted from the fruit by pressing or diffusion. The juice is then clarified and filtered and finally concentrated, preferably in a vacuum evaporator, until it reaches 72 degrees Balling, or more, according to the juice under treatment. In the case of grape juice I prefer a concentration of 78 degrees Balling.

The thickened sirup or concentrate thus obtained is then worked by whipping or kneading violently, while it is still hot, until cooling has taken place, so as to incorporate minute bubbles of air into the mass and effect a crystallization which produces a product resembling honey in consistency and flavor.

Applying my process specifically to the making of an artificial honey from grapes I pass the grapes thru the usual crushing and stemming machinery. The juice is then drained off and the pulp conveyed to a diffusion battery, in which the pulp is washed so as to extract the balance of the fruit juice.

The two juices, that is, that from the drainage, and that from the diffusion battery, may be used separately or blended together as desired.

The juice is then run thru a centrifugal separator to take out the larger part of the sediment, thus relieving of that task, and greatly increasing the capacity of the filters thru which the juice must later pass.

The centrifugal juice is then tested for acidity and its acidity corrected either by the addition of a neutralizing media such as milk of lime, or by an acidifying media such as citric or tartaric acid. The acidity of the juice must be as low as it is possible to get it without causing a darkening of the juice. In the case of grape juice, the acidity should be about .2 of 1%. A small amount of filter cell, say 2 to 4 pounds per 100 gallons of juice, is added and stirred thoroughly and then the juice is passed thru a filter press to clarify it.

The clear filtered juice is next subjected to treatment in a vacuum evaporator in which concentration is carried on under the highest vacuum possible, which should be not less than 26 inches. The concentration is carried as far as possible, considering the characteristics of the juice treated. In the case of grape juice concentration may be carried to 78 degrees Balling or even higher. With juices such as apple juice, this cannot be done without first separating the pectins to prevent jellying. With some juices an evaporating pan may be needed in addition to the vacuum evaporator.

As a final step, the concentrated sirup is run into any suitable kneading or mixing or whipping machine in which it is continually worked while it is cooling. This working incorporates a considerable volume of air in the mass in the form of minute bubbles and brings about a crystallization which gives to the product the consistency and taste of honey.

The incorporation of air in the mass of concentrate may be effected by injecting jets of air under pressure into the thick sirup, with or without mechanical agitation.

I claim:

1. The process of making a food product from fruit juice which comprises concentrating the juice and agitating the concentrate to incorporate air therein.

2. The process of making a food product from grape juice which comprises concentrating the juice to substantially 78 degrees Balling, and agitating the hot concentrate while cooling to incorporate air and effect a crystallization whereby a honey-like product is formed.

3. The process of making a food product from fruit juice which comprises correcting the acidity to as low a degree as possible without causing darkening of the juice, evaporating the juice, and agitating the hot concentrate while cooling.

4. The process of making a food product from grape juice which comprises correcting the acidity of the juice to substantially .2 of 1%, then concentrating the juice to substantially 78 degrees Balling, and agitating the hot concentrate while cooling to incorporate air and effect a crystallization.

5. A food product comprising a crystallized fruit juice of honey-like consistency embodying minute bubbles of gas.

6. An artificial honey comprising a kneaded fruit juice concentrate.

In testimony whereof, I have hereunto set my hand.

EDMUND H. TWIGHT.